United States Patent [19]
Tupper

[11] 3,720,049
[45] March 13, 1973

[54] SIDE SHARPENABLE CUTTER STRUCTURES

[75] Inventor: Myron D. Tupper, Portland, Oreg.

[73] Assignee: Omark Industries, Inc., Portland, Oreg.

[22] Filed: Sept. 28, 1971

[21] Appl. No.: 184,337

[52] U.S. Cl. ................................56/291, 56/245
[51] Int. Cl. ...............................................A01d 55/24
[58] Field of Search........56/290, 291, 292, 244, 245, 56/154, 16.7

[56] References Cited

UNITED STATES PATENTS

| 3,641,751 | 2/1972 | Locati et al. | 56/292 |
| 3,545,188 | 12/1970 | Locati et al. | 56/245 |
| 3,561,202 | 2/1971 | Tupper | 56/291 |
| 3,594,998 | 7/1971 | Graversen | 56/290 |

*Primary Examiner*—Russell R. Kinsey
*Attorney*—Stephen W. Blore et al.

[57] ABSTRACT

Endless V-belts mounted on swathers or mowers carry side sharpenable cutters secured to the belts. One cutter includes a body having a tang projecting through a slot in the V-belt and locked thereto by a transverse roll pin with angular, oppositely extending, transverse feet portions of the body engaging the outer face of the belt, an offsetting portion extending outwardly from the belt, a shank portion transverse to the offsetting portion, and an inclined cutter plate which has a side surface which can be ground to sharpen a cutting edge thereon. The cutter plate has an angularly positioned outer edge portion which causes the cutting edge to be hooked when sharpened. In another cutter, the mounting plate extends completely through the V-belt and a roll pin and an arcuate washer secure the mounting plate to the V-belt. Another cutter includes an angular body portion, an off-setting portion and a shank portion forming a U. The shank portion carries an inclined side cutter, and a staple extends through the body, the belt and an arcuate washer to secure the cutter to the belt. An inclined side plate is secured to a shank carried by a body portion joining the shank and the foot.

5 Claims, 8 Drawing Figures

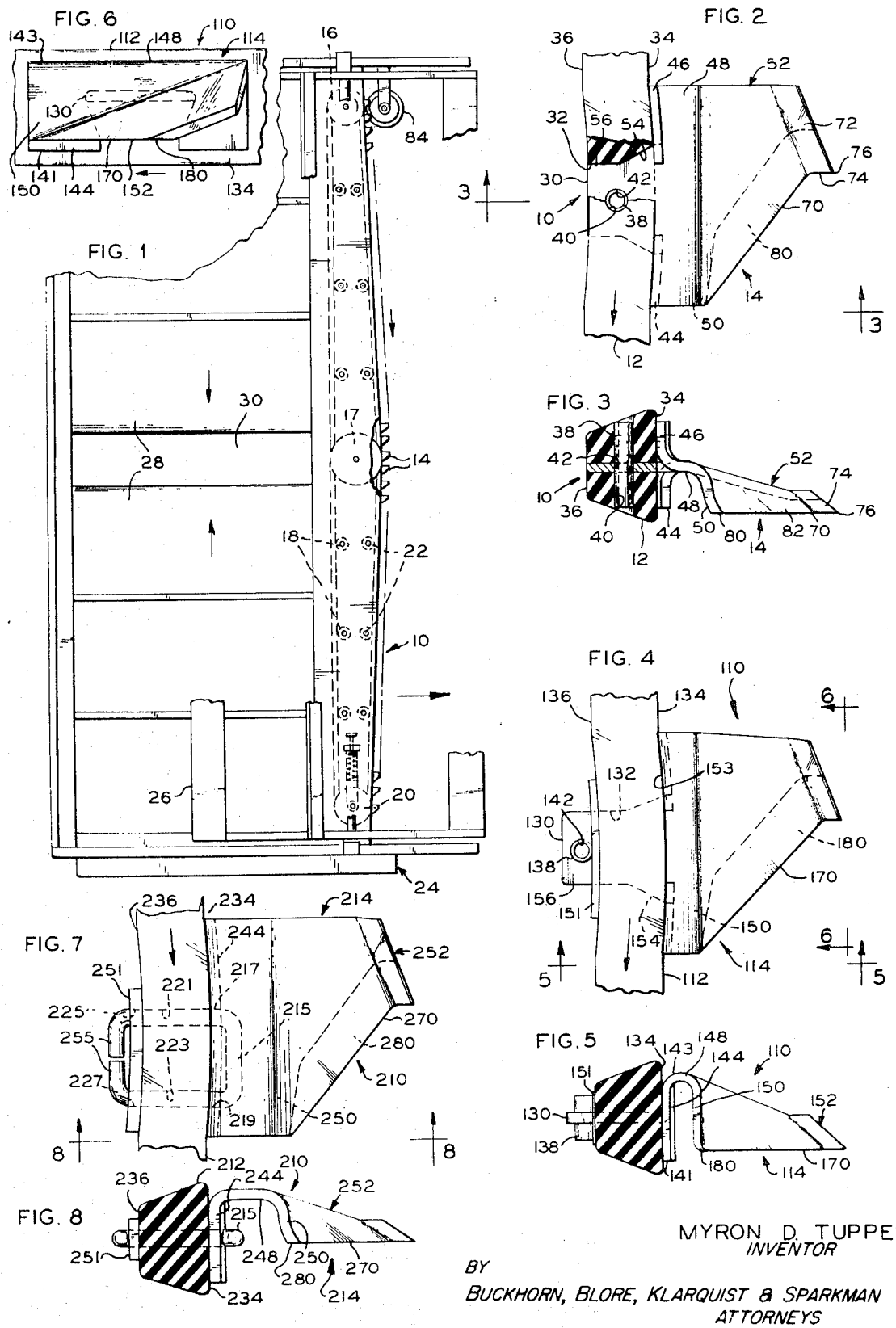

SIDE SHARPENABLE CUTTER STRUCTURES

This invention relates to improved side sharpenable cutter structures, and more particularly to improved vegetation cutting systems.

Cutting systems including side sharpenable cutters carried by an endless belt are disclosed and claimed in U.S. Pat. No. 3,561,202. Such cutters may be quickly and easily sharpened by moving an abrasive sharpening member into engagement with forward, side edge surfaces of inclined side cutter plates while the belt advances the cutters past the sharpener. Such cutting systems work very well. However, it would be desirable to reduce the tendency to round backwardly of outer end portions of the cutting edges.

An object of the invention is to provide new and improved side sharpenable cutter structures.

Another object of the invention is to provide new and improved vegetation cutting systems.

A further object is to provide new and improved cutters having angular cutting edges.

Another object of the invention is to provide cutters having angular end portions providing hooked cutting edges when sharpened in a plane.

The invention provides improved, side-sharpenable cutter structures, each including a cutter plate and with a bent end portion so inclined that the cutting edge is hooked.

In the drawings:

FIG. 1 is a fragmentary, top plan view of a swather which includes an improved side-sharpenable cutter structure forming one embodiment of the invention;

FIG. 2 is a fragmentary, enlarged, top plan view of the cutter structure of FIG. 1;

FIG. 3 is a vertical sectional view taken along line 3—3 of FIG. 2;

FIG. 4 is a fragmentary, top plan view of an improved side sharpenable cutter structure forming an alternate embodiment of the invention;

FIG. 5 is a vertical sectional view taken along line 5—5 of FIG. 4;

FIG. 6 is an enlarged side elevation view taken along line 6-6 of FIG. 4;

FIG. 7 is a fragmentary top plan view of an improved side sharpenable cutter structure forming an alternate embodiment of the invention; and FIG. 8 is a vertical sectional view taken along line 8—8 of FIG. 7.

Referring now in detail to the drawings, an improved side sharpenable cutter structure 10 (FIG. 1, 2 and 3) forming one embodiment of the invention includes an endless, reinforced, rubber or rubberlike V-belt 12 carrying cutters 14, and driven along an endless path by a grooved drive roller 16 and guided by grooved guide pulleys 18, 20 and 22. The pulleys form a portion of a swather 24 which includes a driven reel 26 which lays cut vegetation back on slatted belts 23. The belts deliver the cut vegetation to a discharge opening to form a windrow on the ground as the swather is advanced through the field.

Each cutter 14 is of one piece formed from sheet metal, and has a tang or mounting plate 30 fitting closely in a slot 32 extending from an outer face 34 of the V-belt 12 to an inner face 36 thereof. A roll pin 38 fits closely in and extends through a hole 40 in the V-belt and a hole 42 in the tang to securely fasten the cutter to the belt. The roll pin is slit longitudinally and is of spring metal so that, while it normally holds itself in the hole 42, the roll pin can be compressed laterally by pliers or the like and withdrawn from the holes 40 and 42 for replacement of the cutter 14. Planar feet or body portions 44 and 46 of the cutter 14 are bent to project from opposite sides of an offsetting portion 48 of a shank 50 which mounts an inclined side plate 52. The feet are inclined somewhat relative to each other as best shown in FIG. 2 so as to lie along chords of an arc and, in effect, form a concave or arcuate mounting plate adapted to provide clearance for the V-belt to permit the V-belt to flex and conform to each of the pulleys 16, 17, 18, 20 and 22 as it travels around these pulleys. The tang 30 has a tapered portion 54 and a narrower end portion 56 and the slot 32 is substantially complementary in shape to the shank. The feet 44 and 46 are of substantially the same length and width. The foot 44, the offsetting portion 48 and the shank 50 form essentially a U as viewed in FIG. 3, and the foot 46, the offsetting portion 48 and the shank 50 form essentially a Z as viewed in FIG. 3.

The side plate 52 is inclined upwardly and rearwardly relative to the horizontal plane of the centerline of the V-belt 12 and has a cutting edge 70 inclined rearwardly and outwardly relative to the belt at an angle preferably of not greater than 60° to the adjacent portion of the belt so that a slicing action is imparted, the belt preferably being driven at least 3000 feet per minute so that the cutters have an impact cutting effect. The slicing action reduces the power necessary to provide the impact cutting. The side plate is tilted rearwardly and upwardly relative to the direction of advancement at an angle of preferably not substantially less than 40° relative to the horizontal and not substantially greater than 55° to the horizontal. This provides longevity to the cutting edge, permits many sharpenings and a good, quite acute cutting edge. In addition to this rearward and upward inclination, the side plate also is tilted downwardly slightly relative to the perpendicular to the counterline of the V-belt to provide the sweptback cutting edge 70. The side plate is planar except that outer edge portion 72 is bent somewhat upwardly from the remainder of the side plate to cause trailing end portion 74 of the cutting edge to be slightly hooked forwardly and corner 76 to keep pointed. This compensates for wear during use and offsets the resulting tendency for the end portion to round backwardly relative to the portion of the cutting edge along the remainder of the side plate. That is, the trailing end portion 74 is substantially at right angles to the adjacent portion of the belt and this minimizes rounding of the point 76 and keeps the outer end portion of the cutting edge at the desired angle.

The cutting edge 70 is defined by a sharpening surface 80 which is the lower, forward end or edge of the side plate 52, and leading or forward face 82 of the side plate. The surface 80 preferably is in a horizontal plane and is abraded when desired by bringing up an abrasive annular sharpening member 84 (FIG. 1) into engagement with the surface 80 as the V-belt 12 is advanced around the drive pulley 16. The sharpening member 84 abrades the surfaces 80 to sharpen the cutting edges 70 of the cutters 14, and sharpens all the cutters to the same extent so that the edges 70 lie in the same plane. As indicated above, the surfaces 80 and the abrading face of the member 84 are preferably horizontal. However, if desired, the member 84 can be tilted to cause the surfaces 80 to be tilted relative to the horizontal.

The feet 44 and 46 provide a stable support on the V-belt 12 for the cutters 14 and the positions of the feet form a concave configuration which, with only the roll pin 38 restraining the inner portion of the V-belt, permit the belt to flex easily to a curved configuration. This permits the belt to smoothly conform to the pulleys, thereby providing smooth travel of the belt which is essential to the high operating speed of the belt which may be from 3000 to greater than 10,000 feet per minute.

EMBODIMENTS OF FIGS. 4 TO 6

An improved side sharpenable cutter structure 110 forming an alternate embodiment of the invention includes an endless V-belt 112 carrying side sharpenable cutters 114, and is similar to the cutter structure 10 except as brought out hereinafter. Each cutter 114, as are the cutters 14, is formed entirely from a blank of sheet metal. Each cutter 114 has a concave foot or body 144 from which a tapered portion 154 of a tang 130 is cut and bent to a substantially perpendicular position relative thereto. The tang has a narrower end portion 156 which extends inwardly beyond inner face 136 of the V-belt. A roll pin 138 extends through and is compressed in a hole 142 in the tang and bears against an arcuate, slotted washer 151 concentric to inner face 153 of the foot 144 to tension the shank and hold the face 153 tightly against outer face 134 of the V-belt. The tang fits closely in a slot 132 in the V-belt. This permits the V-belt to flex freely and conform to the pulleys (not shown) on which it is mounted, the pulleys, of course, having deep V-grooves to provide clearance for the ends of the tangs, the roll pins and the washers, the grooves being of such a width as to just substantially fully receive the V-belt. The tang 130 is substantially equidistant from lateral edges 141 and 143 (FIGS. 5 and 6) of the foot 144. A side plate 152 having a cutting edge 170 and a sharpening surface 180 is identical to the side plate 52 and is carried by a shank 150 joined to the foot 144 by an offsetting portion 148 forming a portion of the shank. The shank 150 and the foot 144 form a U in transverse cross section.

EMBODIMENT OF FIGS. 7 AND 8

A side sharpenable cutter structure 210 forming an alternate embodiment of the invention includes a V-belt 212 carrying cutters 214 spaced therealong. The cutters 214 are like the cutters 14 and 114 except that the cutters 214 have no tabs and are secured to the V-belt 212 by staples 215 extending through holes 217 and 219 respectively in the central and forward portions of an arcuate foot or body 244, holes 221 and 223 in the V-belt and holes 225 and 227 in an arcuate washer 251. Each staple 215 has bent over end portions 255 engaging the washer 251 and pulling the foot 244 tightly against outer face 234 of the V-belt and pressing the washer 251 tightly against inner face 236 of the V-belt. The washer 251 is of a length just over one-half the length of the foot 244 and is co-extensive only with about the forward half of the foot 244. Each cutter 214 includes a side plate 252 identical with the side plates 52 and 152 and secured to the foot by a shank 250 having an offsetting portion 248. The side plate 252 has a horizontal lower, forward edge sharpening surface 280 and a sweptback cutting edge 270.

What is claimed is:

1. In an improved cutter structure,
   an endless belt,
   guide means guiding the belt along a predetermined path including a forward cutting course and a rearward return course,
   drive means for moving the belt along said path in a predetermined belt advancement direction along said forward cutting course,
   means for moving the guide means and the belt in a swath advancement direction generally transverse to said belt advancement direction,
   and a plurality of cutters carried by the belt and including cutter plates in positions sloping relative to said belt advancement direction and having planar sharpenable end surfaces and cutting edges lying in a plane parallel to said belt advancement direction,
   the cutter structure having no obstructions forwardly or rearwardly of the sharpenable end surfaces so that the end surfaces can be ground by moving them in said belt advancement direction past a planar abrasive surface in the plane of the planar end surfaces being contacted thereby sharpening the cutting edges,
   the cutters being sloped with respect to end surfaces thereof to slope the cutting edge relative to the perpendicular to said belt advancement direction, the outer end portion of each of the cutter plates being bent out of the plane of the remainder of the cutter plate to form a different slope than that of the remainder of the cutter plate so that the cutting edge portion along the outer edge portion is at an angle to the cutting edge portion along the remainder of the plate.

2. The improved cutter structure of claim 1 wherein the planar sharpenable end surfaces are horizontal and said remainder of each of the cutter plates is proceeding directly away from the belt, sloped downwardly.

3. The improved cutter structure of claim 2 wherein proceeding directly outwardly from the belt, the slope of each of the end portions of the cutter plates relative to the horizontal is substantially zero.

4. In an improved cutter structure,
   an endless belt,
   guide means guiding the belt along a predetermined path including a forward cutting course and a rearward return course,
   drive means for moving the belt along said path in a predetermined belt advancement direction along said forward cutting course,
   means for moving the guide means and the belt in a swath advancement direction generally transverse to said belt advancement direction,
   and a plurality of cutters carried by the belt and including cutter plates in positions sloping relative to said belt advancement direction and having planar sharpenable end surfaces and cutting edges lying in a plane parallel to said belt advancement direction,
   the cutter structure having no obstructions forwardly or rearwardly of the sharpenable end surfaces so that the end surfaces can be ground by moving them in said belt advancement direction past a planar abrasive surface in the plane of the planar end surfaces being contacted thereby sharpening the cutting edges, the outer end portion of each of the cutter plates being bent out of the plane of the remainder of the cutter plate, said remainder of each of said cutter plates being inclined to the plane of the end surface thereof to a predetermined extent, proceeding directly away from the belt, so that the cutting edge along said remainder is inclined relative to the perpendicular to the belt advancement direction, the outer end portion of each of the cutter plates being inclined algebraically to a lesser extent to the plane of the end surface than said predetermined extent so that the outer end portion edge hooks forwardly relative to the belt advancement direction.

5. In an improved cutter, an attachment portion for attaching the cutter to carrier means movable along a predetermined path in a predetermined direction, a cutter plate held by the attachment portion in a position extending outwardly away from the carrier means, the cutter plate having a primary portion that is planar and is sloped relative to said predetermined direction and having a planar sharpenable end surface adapted to be advanced by the carrier means past a planar sharpening surface to form a cutting edge, the primary portion of the cutter plate also sloping relative to the perpendicular to the carrier means in a direction of slope such that the cutting edge, proceeding outwardly from the carrier means, slopes rearwardly relative to said predetermined direction, the cutter plate also having an outer end portion bent with respect to the primary portion along a line extending generally in said predetermined direction, the outer end portion being bent in a direction such that an end cutting edge portion is in the same plane as the cutting edge, forms a continuation of the cutting edge and hooks forwardly relative to the cutting edge.

* * * * *